US010566872B2

(12) United States Patent
Miyoshi et al.

(10) Patent No.: US 10,566,872 B2
(45) Date of Patent: Feb. 18, 2020

(54) SPINDLE MOTOR HAVING A BUSHING FOR A LEAD WIRE

(71) Applicant: Nidec Corporation, Kyoto (JP)

(72) Inventors: Ryo Miyoshi, Kyoto (JP); Takuo Miyake, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 128 days.

(21) Appl. No.: 15/917,886

(22) Filed: Mar. 12, 2018

(65) Prior Publication Data

US 2019/0097483 A1    Mar. 28, 2019

(30) Foreign Application Priority Data

Sep. 26, 2017   (JP) ................... 2017-184787

(51) Int. Cl.
| | |
|---|---|
| *H02K 3/38* | (2006.01) |
| *H02K 1/16* | (2006.01) |
| *H02K 3/50* | (2006.01) |
| *H02K 3/12* | (2006.01) |
| *H02K 3/52* | (2006.01) |

(Continued)

(52) U.S. Cl.
CPC ................ *H02K 3/38* (2013.01); *H02K 1/16* (2013.01); *H02K 3/12* (2013.01); *H02K 3/50* (2013.01); *H02K 3/522* (2013.01); *H02K 5/225* (2013.01); *H02K 11/33* (2016.01); *H02K 2203/06* (2013.01)

(58) Field of Classification Search
CPC .. H02K 1/16; H02K 3/12; H02K 3/38; H02K 3/50; H02K 2203/06
USPC .......................................... 310/71, 90.5, 156
See application file for complete search history.

(56) References Cited

U.S. PATENT DOCUMENTS

| | | | | |
|---|---|---|---|---|
| 5,831,355 | A * | 11/1998 | Oku ................... | G11B 19/2009 310/12.31 |
| 9,166,452 | B1 * | 10/2015 | Endo .................. | G11B 19/2009 |

(Continued)

FOREIGN PATENT DOCUMENTS

JP          2009-247103 A      10/2009

OTHER PUBLICATIONS

Yoshitake et al., English Machine Translation of JP 2009-247103 (Year: 2009).*

*Primary Examiner* — Jermele M Hollington
*Assistant Examiner* — Rashad H Johnson
(74) *Attorney, Agent, or Firm* — Keating & Bennett (57) ABSTRACT

A motor includes a lead wire insert hole arranged to have a lead wire extending from any of coils pass therethrough, and a bushing inserted in the lead wire insert hole. The bushing includes a body portion arranged to extend in a first direction; a plurality of through holes each of which is arranged to pass through the body portion in the first direction; and a plurality of projecting portions each of which is arranged to extend in the first direction, and project from a lateral surface of the body portion in a direction perpendicular to the first direction. Each through hole includes a cylindrical first hole portion arranged to have an opening on a first side in the first direction; and a second hole portion arranged to have an opening on a second side in the first direction, and to be continuous with the first hole portion, and including a slanting surface arranged to decrease in a diameter toward the first hole portion. A portion of the lead wire is arranged in a corresponding one of the through holes.

11 Claims, 7 Drawing Sheets

(51) Int. Cl.
*H02K 11/33* (2016.01)
*H02K 5/22* (2006.01)

(56) References Cited

U.S. PATENT DOCUMENTS

| | | | | |
|---|---|---|---|---|
| 2011/0249362 A1* | 10/2011 | Saichi | ................ | G11B 19/2009 360/99.08 |
| 2012/0047523 A1* | 2/2012 | Smirnov | ............ | G11B 19/2009 720/696 |
| 2016/0164364 A1* | 6/2016 | Yoneda | .................. | H02K 5/225 310/71 |
| 2016/0164365 A1* | 6/2016 | Yoneda | .................... | H02K 5/10 310/71 |

* cited by examiner

SPINDLE MOTOR HAVING A BUSHING FOR A LEAD WIRE

CROSS REFERENCE TO RELATED APPLICATIONS

This application claims the benefit of priority to Japanese Patent Application No. 2017-184787 filed on Sep. 26, 2017. The entire contents of this application are hereby incorporated herein by reference.

BACKGROUND OF THE INVENTION

1. Field of the Invention

The present invention relates to a motor.

2. Description of the Related Art

A known motor is described in, for example, JP-A 2009-247103. The motor described in JP-A 2009-247103 includes a base member including an insert hole through which an end of a conducting wire drawn out from a coil is inserted. The motor further includes a connector including an electrode plate to be connected to the conducting wire, and the connector further includes a hollow boss portion. The boss portion is fitted into the insert hole through press fitting. The conducting wire is passed through a cylindrical through hole defined in the boss portion, and is thereafter fixed to the electrode plate through, for example, adhesion to be connected to a power supply unit.

In the motor described in JP-A 2009-247103, the through hole is a cylindrical hole, and if the size of the insert hole is reduced, the size of an opening for the conducting wire should be reduced, which may make it difficult to insert the conducting wire into the opening.

SUMMARY OF THE INVENTION

Accordingly, the present invention has been conceived to provide a motor which can be assembled with high efficiency while a lead wire extending from a coil is protected.

A motor according to a preferred embodiment of the present invention includes a stator including a plurality of coils; a base arranged opposite to an end surface of the stator on one side; at least one lead wire insert hole arranged to pass through the base from a surface of the base which faces the stator to an opposite surface of the base, and arranged to have a lead wire extending from any of the coils pass therethrough; and a bushing inserted in the lead wire insert hole. The bushing includes a body portion arranged to extend in a first direction in which the bushing is inserted into the lead wire insert hole; a plurality of through holes each of which is arranged to pass through the body portion in the first direction; and a plurality of projecting portions each of which is arranged to extend in the first direction, and project from a lateral surface of the body portion in a direction perpendicular to the first direction, the lateral surface extending in the first direction. Each through hole includes a first hole portion being cylindrical, extending in the first direction, and arranged to have an opening on a first side in the first direction; and a second hole portion arranged to have an opening on a second side in the first direction, and to be continuous with the first hole portion in the first direction, and including a slanting surface arranged to decrease in a diameter toward the first hole portion. A portion of the lead wire is arranged in a corresponding one of the through holes.

The motor according to the above preferred embodiment of the present invention is able to achieve an improvement in efficiency with which the motor is assembled while the lead wire extending from any coil is protected.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 2:
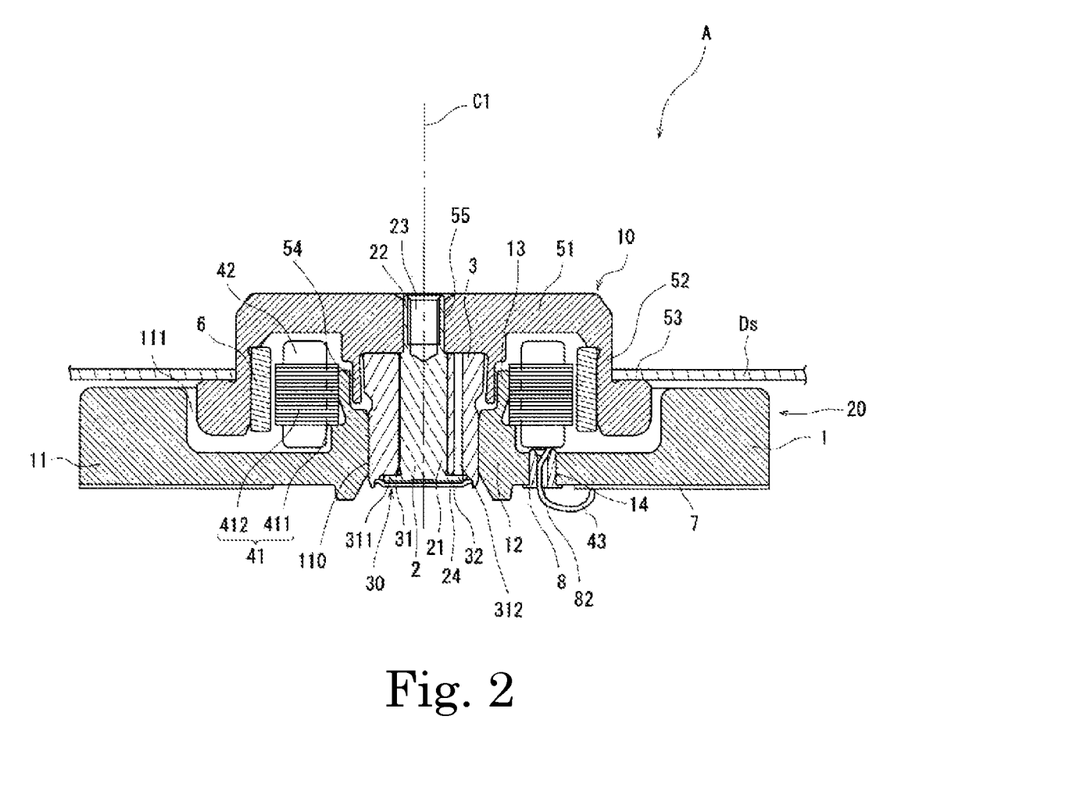
FIG. 2 is a sectional view of the motor illustrated in FIG. 1 taken along a plane including a central axis.

Hereinafter, preferred embodiments of the present invention will be described in detail with reference to the accompanying drawings. It is assumed herein that a direction parallel to a central axis C1 of a motor is referred to by the term "axial direction", "axial", or "axially", that directions perpendicular to the central axis C1 are each referred to by the term "radial direction", "radial", or "radially", and that a direction along a circular arc centered on the central axis C1 is referred to by the term "circumferential direction", "circumferential", or "circumferentially". It is also assumed herein that a motor A illustrated in FIG. 2 is used as a reference to define an upper side and a lower side in a vertical direction along the central axis C1, and the shape of each member or portion and relative positions of different members or portions will be described based on the above assumption. It should be noted, however, that the above definition of the vertical direction and the upper and lower sides is made simply for the sake of convenience in description, and is not meant to restrict relative positions or directions of different members or portions of the motor when in use.

Figure 1:
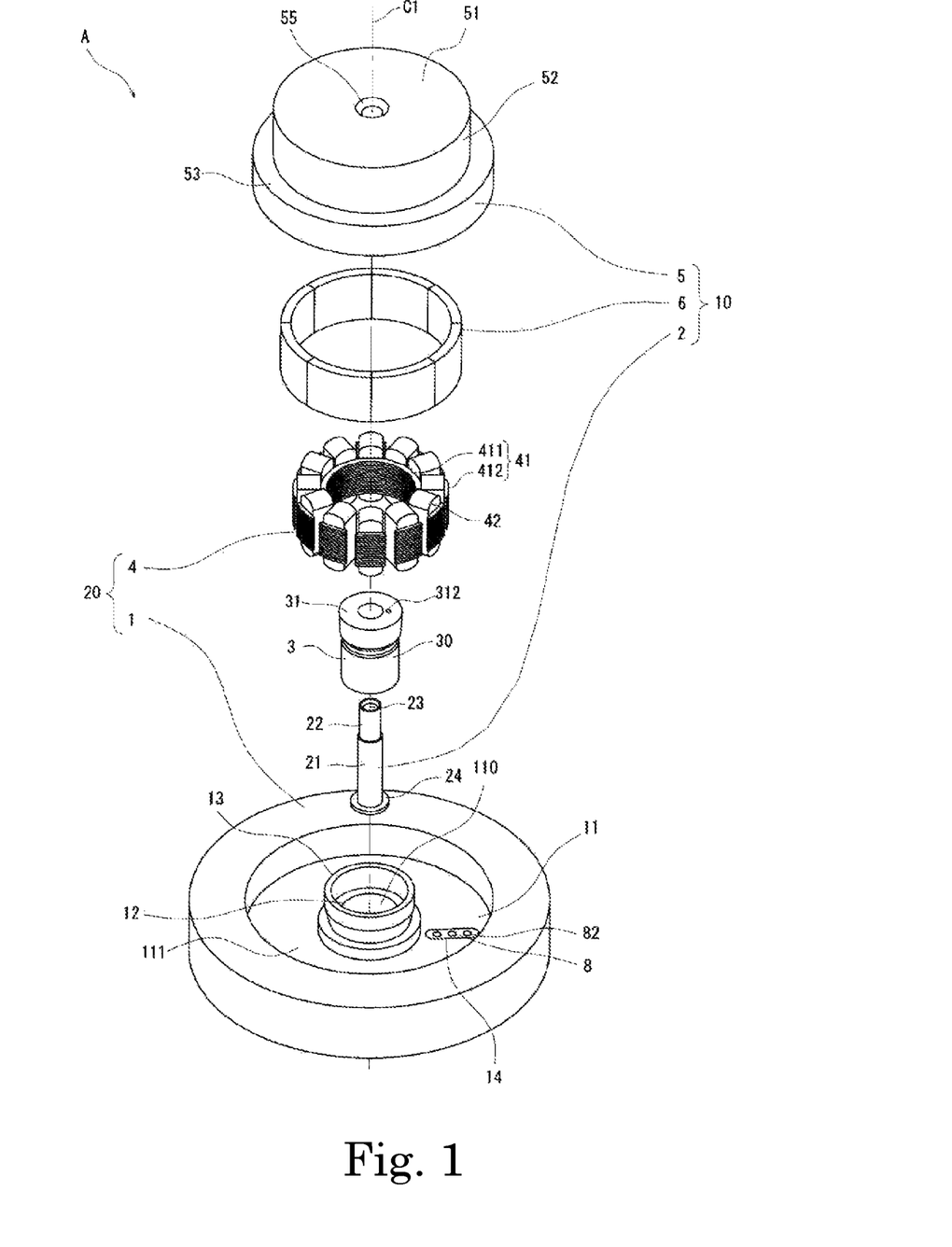
FIG. 1 is an exploded perspective view of a motor according to a first preferred embodiment of the present invention.

Hereinafter, a preferred embodiment of the present invention will be described with reference to the accompanying drawings. FIG. 1 is an exploded perspective view of a motor A according to a first preferred embodiment of the present invention. FIG. 2 is a sectional view of the motor A illustrated in FIG. 1 taken along a plane including the central axis C1. The motor A according to the present preferred embodiment is a so-called spindle motor arranged to rotate a disk-shaped recording disk Ds, such as, for example, a hard disk. In the motor A, a rotor portion 10 is supported through a bearing 30 to be rotatable with respect to a stator portion 20. That is, the rotor portion 10 is supported to be rotatable about the central axis C1 with respect to the stator portion 20.

Referring to FIGS. 1 and 2, the motor A according to the present preferred embodiment includes a base 1, a shaft 2, a sleeve 3, a stator 4, a hub 5, a rotor magnet 6, and a circuit board 7. The rotor portion 10 includes the shaft 2, the hub 5, and the rotor magnet 6. The stator portion 20 includes the base 1 and the stator 4. The bearing 30 includes the sleeve 3.

In the rotor portion 10, the shaft 2 is fixed to a central portion of the hub 5. In addition, the rotor magnet 6 is arranged inside of the hub 5, and the central axis C1 is a center of each of the shaft 2 and the rotor magnet 6.

Referring to FIGS. 1 and 2, the shaft 2 is columnar. The shaft 2 includes a first shaft portion 21, a second shaft portion 22, a screw hole 23, and a flange portion 24. The shaft 2 is made of a metal. The shaft 2 is arranged to extend along the central axis C1.

The first shaft portion 21 is arranged to extend in an axial direction. The second shaft portion 22 is cylindrical, and is arranged axially above the first shaft portion 21. The second shaft portion 22 is arranged to have a diameter smaller than that of the first shaft portion 21. The first and second shaft portions 21 and 22 are made of the same material, and are defined integrally with each other. The screw hole 23 is recessed downward from an axially upper surface of the shaft 2. An inner surface of the screw hole 23 includes a female screw. In addition, the flange portion 24 is arranged to extend radially outward at an axially lower end portion of the shaft 2. The flange portion 24 is in the shape of a disk.

The shaft 2 is fixed to the central portion of the hub 5. The hub 5 and the shaft 2 are arranged to rotate together. Referring to FIGS. 1 and 2, the hub 5 includes a hub top plate portion 51, a hub tubular portion 52, a disk flange 53, a labyrinth projecting portion 54, and a shaft fixing hole 55. Note that, while the shaft 2 of the motor A according to the present preferred embodiment is rotatable, this is not essential to the present invention. A motor according to another preferred embodiment of the present invention may include a fixed shaft 2.

The hub top plate portion 51 is arranged to extend radially. The hub top plate portion 51 is circular when viewed in the axial direction. The hub tubular portion 52 is arranged to extend axially downward from a radially outer edge of the hub top plate portion 51. The hub tubular portion 52 is cylindrical. The disk flange 53 is arranged to extend radially outward from an axially lower end portion of the hub tubular portion 52. The disk flange 53 is circular when viewed in the axial direction. The hub top plate portion 51, the hub tubular portion 52, and the disk flange 53 are made of the same material, and are molded integrally with each other.

An axially upper surface of the disk flange 53 is a flat surface perpendicular to the central axis C1. The disk Ds is arranged to be in contact with the axially upper surface of the disk flange 53. The disk Ds is then fixed to the hub 5. Thus, the disk Ds is fixed so as to be perpendicular to the central axis C1, i.e., a rotation axis. Then, rotation of the hub 5 causes the disk Ds to rotate. Note that, while the motor A according to the present preferred embodiment includes only one disk Ds, this is not essential to the present invention. In a motor according to another preferred embodiment of the present invention, a plurality of disks Ds may be fixed such that the disks Ds are spaced from one another in a direction parallel to the central axis C1. Even in this case, all the disks Ds are fixed so as to be perpendicular to the central axis C1.

The shaft fixing hole 55 is a through hole defined in a center of the hub top plate portion 51 when viewed in the axial direction, and arranged to pass through the hub top plate portion 51 in the axial direction. The second shaft portion 22 of the shaft 2 is inserted into and fixed in the shaft fixing hole 55. The second shaft portion 22 is fixed in the shaft fixing hole 55 through, for example, press fitting.

The labyrinth projecting portion 54 is arranged to project downward from a lower surface of the hub top plate portion 51. The labyrinth projecting portion 54 is tubular, and the labyrinth projecting portion 54 is arranged to have an inside diameter greater than a diameter of the shaft fixing hole 55. Referring to FIG. 2, the labyrinth projecting portion 54 is arranged radially outward of a portion of an axially upper end portion of a sleeve body 31, which will be described below, of the bearing 30. The labyrinth projecting portion 54 and the hub top plate portion 51 are made of the same material, and are molded integrally with each other.

Referring to FIG. 2, the rotor magnet 6 is arranged on an inner surface of the hub tubular portion 52. The rotor magnet 6 is cylindrical, and is arranged to extend along the central axis C1. A radially inner surface of the rotor magnet 6 is arranged radially opposite to a radially outer surface of the stator 4 with a gap therebetween. The rotor magnet 6 includes a plurality of pairs of magnetic poles, each pair including a north pole and a south pole. The rotor magnet 6 may be defined by a cylindrical magnetic body including north and south poles arranged to alternate with each other in a circumferential direction, or alternatively, a plurality of magnets arranged in the circumferential direction may be used as the rotor magnet 6. The rotor magnet 6 is fixed inside of the hub tubular portion 52 through, for example, press fitting. Note that the method for fixing the rotor magnet 6 is not limited to the press fitting, and that adhesion, welding, a mechanical fixing method, and so on may be adopted to fix the rotor magnet 6. In the motor A according to the present preferred embodiment, the rotor magnet 6 includes eight magnetic poles.

The stator portion 20 includes the base 1 and the stator 4. The stator 4 is held by the base 1, so that the radially outer surface of the stator 4 is arranged radially opposite to the radially inner surface of the rotor magnet 6 of the rotor portion 10 with the gap therebetween.

Referring to FIGS. 1 and 2, the base 1 is a bottom portion arranged to cover an axially lower end of the motor A. That is, the base 1 is arranged opposite to an end surface of the stator 4 on one side. The base 1 includes a base plate 11, a sleeve attachment portion 12, a stator holding portion 13, and a lead wire insert hole 14. The base plate 11 is circular, that is, in the shape of a disk, when viewed in the axial direction. A base recessed portion 111 recessed axially downward is defined in an axially upper surface of the base plate 11. A section of the base recessed portion 111 which is perpendicular to the central axis C1 is circular, and an axially lower end portion of the hub 5 is rotatably accommodated in the base recessed portion 111. That is, the base recessed portion 111 is cylindrical, and the axially lower end portion of the hub 5 is arranged to rotate about the central axis C1 inside of the base recessed portion 111.

Note that, although the base plate 11 of the base 1 is in the shape of a disk in the present preferred embodiment, the base plate 11 may not necessarily be in the shape of a disk. For example, the base 1 may alternatively be in the shape of a polygon, such as, for example, a quadrilateral or a hexagon, or in the shape of an ellipse or the like, when viewed in the axial direction. A wide variety of shapes may be adopted for the base 1 in accordance with a device to which the motor A is to be attached. Also note that the base recessed portion 111 may not necessarily be cylindrical, but may alternatively be in any other desirable shape that allows the axially lower end portion of the hub 5 to be rotatably accommodated therein.

A through hole 110, which is arranged to pass through the base plate 11 in the axial direction, is defined in a center of the base plate 11. The sleeve attachment portion 12 is cylindrical, and is arranged to project axially upward from a peripheral portion of the through hole 110. The sleeve attachment portion 12 and the base plate 11 may be made of the same material and be defined integrally with each other, or alternatively, the sleeve attachment portion 12 may be a member separate from the base plate 11 and fixed to the base plate 11. Notice that, in the motor A, the through hole 110 is in a center of the base recessed portion 111.

The sleeve body 31, which will be described below, of the bearing 30 is arranged to be in contact with, and is fixed to, an inner surface of the sleeve attachment portion 12. The stator holding portion 13 is a tubular portion arranged to project axially upward from an axially upper surface of the sleeve attachment portion 12. The stator holding portion 13 is arranged to be in contact with an inner surface of a stator core 41, which will be described below, of the stator 4 to hold the stator 4. As illustrated in FIG. 2, an axially lower side of the stator 4 may be arranged to be in contact with a radially outer surface of the sleeve attachment portion 12. That is, at least a portion of the stator 4 is held by the stator holding portion 13.

The lead wire insert hole 14 is arranged in the base recessed portion 111. The lead wire insert hole 14 is a through hole arranged to pass through the base plate 11 in the axial direction. A bushing 8 is inserted in the lead wire insert hole 14. The bushing 8 includes a plurality of through holes 82. Lead wires 43 drawn out from coils 42, which will be described below, of the stator 4 are arranged to pass through the through holes 82. The lead wires 43 pass through the lead wire insert hole 14 by passing through the respective through holes 82. That is, the bushing 8 is inserted in the lead wire insert hole 14. At least one lead wire insert hole 14 is arranged in the base 1, and is arranged to pass through the base 1 from a surface of the base 1 which faces the stator 4 to an opposite surface of the base 1, and to have the lead wires 43 drawn out from the coils 42 pass therethrough. In addition, the circuit board 7 is attached to an axially lower surface of the base 1. Each lead wire 43 is inserted into a corresponding one of the through holes 82 of the bushing 8 inserted in the lead wire insert hole 14 through an axially upper opening 824 of the corresponding through hole 82, and is drawn out of the corresponding through hole 82 through an axially lower opening 823 thereof. The lead wire 43 drawn out is then connected to the circuit board 7.

The stator 4 is held by the stator holding portion 13 of the base 1. The stator 4 includes the stator core 41, the plurality of coils 42, and the lead wires 43. That is, the stator 4 includes the plurality of coils 42.

The stator core 41 is defined by laminated silicon steel sheets. Referring to FIG. 1, the stator core 41 includes an annular core back portion 411 and tooth portions 412. Referring to FIG. 2, the stator core 41 is defined by plate-shaped members placed one upon another in the axial direction. That is, the stator core 41 is a laminated body. Note, however, that this is not essential to the present invention.

The core back portion 411 is annular, and is arranged to extend in the axial direction. An inner surface of the core back portion 411 is arranged to be in contact with an outer surface of the stator holding portion 13, so that the core back portion 411, hence the stator 4, is held by the stator holding portion 13. The stator holding portion 13 and the core back portion 411 are fixed to each other through press fitting. Note that other fixing methods than the press fitting, such as adhesion, welding, and the like, may be widely adopted to securely fix the stator holding portion 13 and the core back portion 411 to each other.

Each tooth portion 412 is arranged to project radially outward from a radially outer surface of the core back portion 411. The stator core 41 includes twelve of the tooth portions 412. The tooth portions 412 are arranged at regular intervals in the circumferential direction. The stator 4 has twelve slots. The motor A according to the present preferred embodiment includes the rotor magnet 6 with eight magnetic poles, and the stator 4 with twelve slots. That is, the motor A is an outer-rotor motor having eight poles and twelve slots.

Each tooth portion 412 of the stator core 41 is covered with an insulator, which is not shown. Each tooth portion 412 covered with the insulator has one of the coils 42 defined by a conducting wire wound therearound. The insulator provides isolation between the stator core 41 and each coil 42. The coil 42 is arranged around each of the tooth portions 412 of the stator core 41. That is, the stator 4 includes twelve of the coils 42. The twelve coils 42 included in the stator 4 are divided into three groups (hereinafter referred to as three phases) which differ in timing of supply of an electric current. The three phases are defined as a U phase, a V phase, and a W phase, respectively. That is, the stator 4 includes four U-phase windings, four V-phase windings, and four W-phase windings. Hereinafter, the windings of the three phases will be simply referred to collectively as the coils 42.

The lead wires 43 are arranged to electrically connect the coils 42 of the U, V, and W phases to a circuit (not shown) mounted on the circuit board 7. Referring to FIG. 2, each lead wire 43 is drawn out downwardly from the axially lower side of the stator 4. The lead wire 43 is then passed through the lead wire insert hole 14 of the base 1 to be drawn out downwardly of the base 1, and is electrically connected to a wiring pattern (not shown) on the circuit board 7. Each lead wire 43 is connected to the wiring pattern through soldering. Note, however, that each lead wire 43 may be connected to the wiring pattern using a connection member, such as, for example, a connector, instead of through the soldering.

Next, the bearing 30, which is arranged to support the rotor portion 10 such that the rotor portion 10 is rotatable with respect to the stator portion 20, will now be described below. The bearing 30 is a fluid dynamic bearing using a fluid. The bearing 30 is arranged to rotatably support the shaft 2. The bearing 30 includes the sleeve body 31 and a seal cap 32. Each of the sleeve body 31 and the seal cap 32 is made of, for example, stainless steel or the like. The sleeve body 31 and the seal cap 32 together define the sleeve 3.

The sleeve body 31 is cylindrical, and is centered on the central axis C1. The sleeve body 31 has, at a lower portion thereof, a shoulder portion 311 recessed upward. The flange portion 24 of the shaft 2 is accommodated in the shoulder portion 311. In addition, the seal cap 32 is attached to the shoulder portion 311 to cover a lower side of the flange portion 24. The seal cap 32 is fixed by a fixing method using an adhesive or the like.

The sleeve body 31 includes a circulation hole 312 arranged to pass therethrough in the axial direction at a position radially outward of the central axis C1. The circulation hole 312 is in communication with a gap between the seal cap 32 and the shoulder portion 311 at the lower portion of the sleeve body 31.

Minute gaps are defined between an inner circumferential surface of the sleeve body 31 and an outer circumferential surface of the shaft 2, between the sleeve body 31 and an upper surface and an outer circumferential surface of the flange portion 24, and between an upper surface of the seal cap 32 and a lower surface of the flange portion 24. A lubricating oil as the fluid is continuously arranged in these minute gaps. Thus, the bearing 30 of the motor A is defined by the sleeve body 31, the seal cap 32, the shaft 2, and the lubricating oil.

The flange portion 24 and a portion of the shaft 2 which is radially opposite to an inner surface of the sleeve body 31 include grooves defined therein. When the shaft 2 rotates, these grooves produce dynamic pressures in the lubricating oil. The dynamic pressures cause the lubricating oil to circulate through the gap between the inner surface of the sleeve body 31 and the outer surface of the shaft 2 and a gap between an axially upper end surface of the sleeve body 31 and an axially lower surface of the hub top plate portion 51 of the hub 5. As a result, the shaft is supported through the lubricating oil while being out of contact with the sleeve body 31, allowing the rotor portion 10 to rotate with respect to the stator portion 20 with high precision and reduced noise.

That is, the bearing 30 includes a so-called radial bearing which includes the lubricating oil circulating through the gap between the outer surface of the shaft 2 and the sleeve body 31, and which is arranged to support rotation of the shaft 2. In addition, the bearing 30 includes a so-called thrust bearing which includes the lubricating oil circulating through the gap between the sleeve body 31 and the axially lower surface of the hub top plate portion 51, and which is arranged to support the shaft 2 in the axial direction.

The motor A according to the present preferred embodiment has the above-described structure. Next, important portions of the motor A according to the present preferred embodiment will now be described below with reference to the accompanying drawings.

Figure 3:
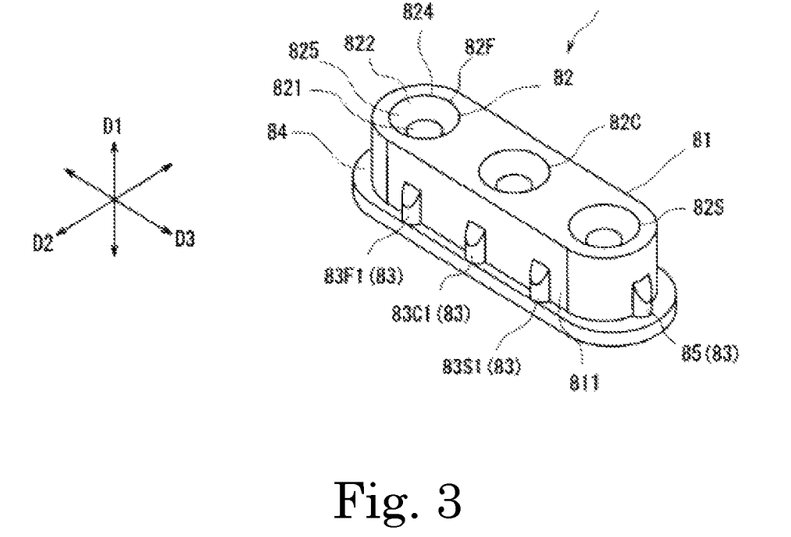
FIG. 3 is a perspective view of a bushing of the motor according to the first preferred embodiment of the present invention.
Figure 4:
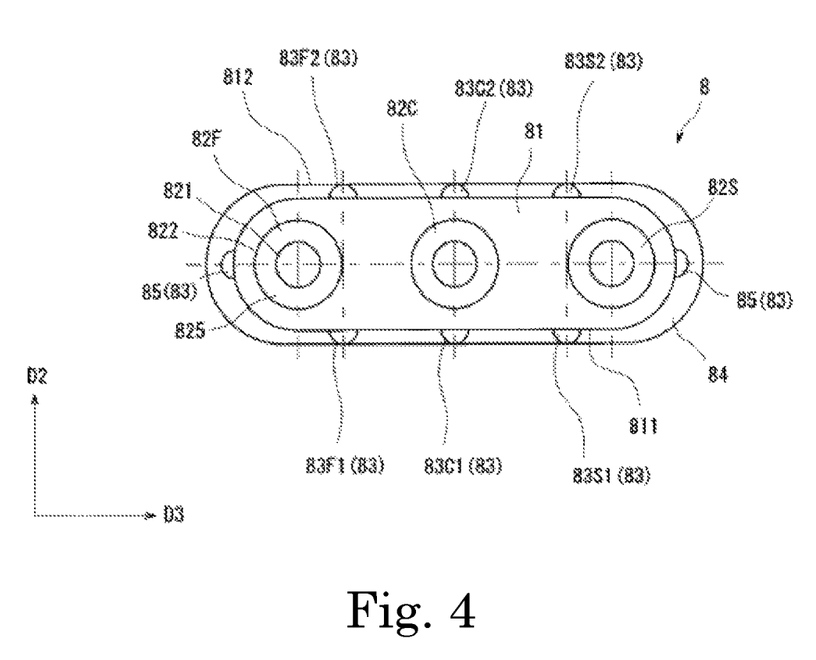
FIG. 4 is a plan view of the bushing illustrated in FIG. 3.
Figure 5:
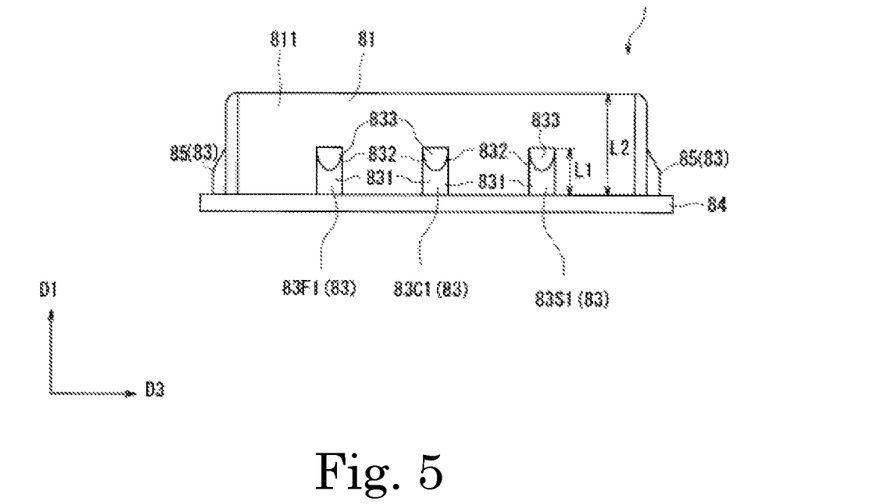
FIG. 5 is a front view of the bushing illustrated in FIG. 3.
Figure 6:
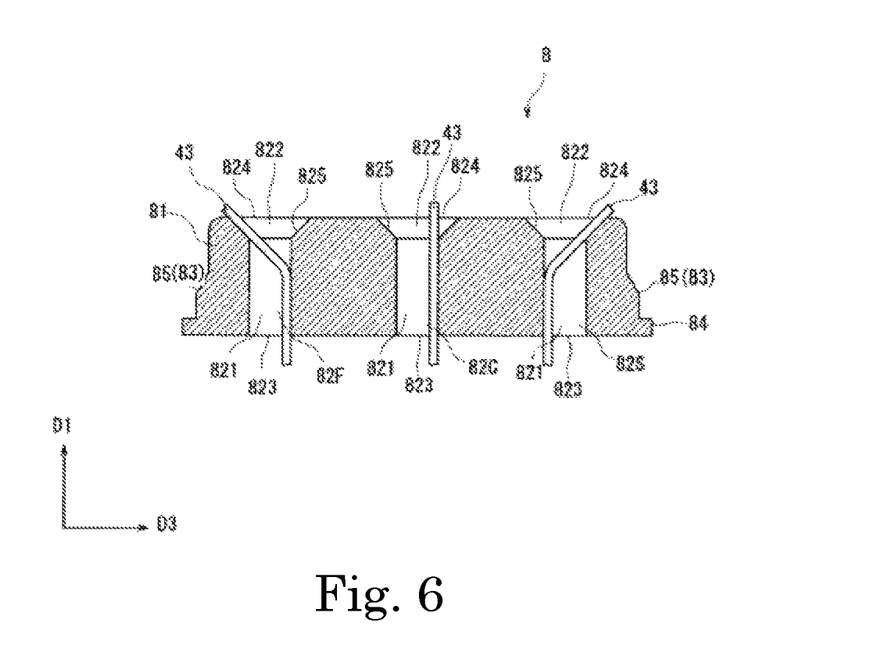
FIG. 6 is a vertical sectional view of the bushing illustrated in FIG. 3.

FIG. 3 is a perspective view of the bushing 8 of the motor A according to the first preferred embodiment of the present invention. FIG. 4 is a plan view of the bushing 8 illustrated in FIG. 3. FIG. 5 is a front view of the bushing 8 illustrated in FIG. 3. FIG. 6 is a vertical sectional view of the bushing 8 illustrated in FIG. 3. It is assumed in the description of the present preferred embodiment that a vertical direction of the bushing 8 illustrated in FIG. 5 is a first direction D1, that a widthwise direction of the bushing 8 illustrated in FIG. 4 is a second direction D2, and that a longitudinal direction of the bushing 8 illustrated in FIG. 4 is a third direction D3. Notice that each of the second and third directions D2 and D3 is a direction perpendicular to the first direction D1. It is also assumed that a lower side and an upper side of the bushing 8 illustrated in FIG. 5 are a first side and a second side, respectively, in the first direction D1.

The bushing 8 is made of a material capable of elastic deformation, such as, for example, rubber or a silicone. The bushing 8 is inserted in the lead wire insert hole 14 of the base 1. The bushing 8 is arranged to protect and insulate the lead wires 43 passing through the lead wire insert hole 14.

Referring to FIGS. 3 to 6, the bushing 8 includes a body portion 81, the plurality of through holes 82, a plurality of projecting portions 83, and a flange portion 84. That is, the bushing 8 includes the body portion 81, the plurality of through holes 82, and the plurality of projecting portions 83. The body portion 81 is in the shape of a column having an elongated bottom surface shaped like a rectangle with both end portions in the longitudinal direction in the shape of a circular arc. That is, the body portion 81 is arranged to extend in the first direction D1. The first direction D1 corresponds to a direction in which the bushing 8 is inserted into the lead wire insert hole 14 (see FIGS. 1 and 2). In addition, the body portion 81 includes a first flat surface 811 and a second flat surface 812 at ends thereof in the second direction D2, which is perpendicular to the first direction D1. The first and second flat surfaces 811 and 812 are arranged in parallel with each other in the second direction D2. That is, the body portion 81 includes two flat surfaces arranged in parallel with each other in the second direction D2.

The flange portion 84 is arranged at an end portion of the body portion 81 on the first side in the first direction D1, i.e., at a lower end portion of the body portion 81 in FIGS. 3 and 5. The flange portion 84 is arranged to have a contour larger than that of the body portion 81 in a plan view. That is, the flange portion 84 is arranged to extend outward from an outer surface of the body portion 81. The body portion 81 and the flange portion 84 are molded integrally with each other. That is, the flange portion 84 is arranged at the end portion of the body portion 81 on the first side in the first direction D1, and the flange portion 84 is arranged to extend outward therefrom. Thus, when the body portion 81 is inserted into the lead wire insert hole 14, the flange portion 84 facilitates positioning of the body portion 81 in the insertion direction.

The number of through holes 82 defined in the body portion 81 is three. Note that the number of through holes 82 is not limited to three. Each through hole 82 is arranged to join both end surfaces of the body portion 81 in the first direction D1. That is, each of the through holes 82 is arranged to pass through the body portion 81 in the first direction D1. In addition, the three through holes 82 are arrayed in the third direction D3. In other words, the plurality of through holes 82 are arrayed on a straight line extending in the third direction D3, which is perpendicular to both the first direction D1 and the second direction D2. The lead wires 43 are arranged to pass through the respective through holes 82. That is, a portion of each lead wire 43 is arranged in a corresponding one of the through holes 82.

Referring to FIG. 6, each through hole 82 includes a first hole portion 821 and a second hole portion 822. The first hole portion 821 is a cylindrical hole arranged to extend along the first direction D1. In addition, the first hole portion 821 has the opening 823 on the first side in the first direction D1, i.e., on the lower side in FIG. 6. That is, the first hole portion 821 is cylindrical, extending in the first direction D1, and has the opening 823 on the first side in the first direction D1.

The second hole portion 822 is a through hole arranged to extend along the first direction D1. The second hole portion 822 is arranged on the second side of the first hole portion 821 in the first direction D1. The second hole portion 822 has the opening 824 on the second side in the first direction D1. An end of the first hole portion 821 on the second side in the first direction D1 and an end of the second hole portion 822 on the first side in the first direction D1 are joined. That is, the second hole portion 822 has the opening 824 on the second side in the first direction D1, is continuous with the first hole portion 821 in the first direction D1, and includes a slanting surface 825 arranged to decrease in a diameter toward the first hole portion 821. The above arrangement causes the second hole portion 822 to have the greatest diameter at the opening 824, facilitating the insertion of the lead wire 43.

Referring to FIG. 6, in each through hole 82, an extension of the slanting surface 825 of the second hole portion 822 into the first hole portion 821 crosses a wall surface of the first hole portion 821. That is, the slanting surface 825 of the second hole portion 822 is arranged to slant such that the extension of the slanting surface 825 into the first hole portion 821 crosses the wall surface of the first hole portion 821. This ensures that, when the lead wire 43 is inserted into the through hole 82 through the opening 824 of the second hole portion 822, an end of the lead wire 43 will be brought into contact with the wall surface of the first hole portion 821. The lead wire 43 is then extended along the first hole portion 821, i.e., along the first direction D1. Further, the lead wire 43 is drawn out through the opening 823 of the first hole portion 821 along the first direction D1.

For example, even if the lead wire 43 is not in parallel with the first direction D1 at the opening 824 of the second hole portion 822, the lead wire 43 will be drawn out through the opening 823 of the first hole portion 821 in a direction along the first direction D1. The bushing 8 includes a plurality (three in this preferred embodiment) of such through holes 82. Thus, even if the lead wires 43 are oriented in various directions when inserted into the openings 824 of the respective through holes 82, all the lead wires 43 will be drawn out through the openings 823 along the first direction D1. This allows the lead wires 43 to be efficiently connected to the circuit board 7. In addition, since all the lead wires 43 are drawn out along the first direction D1, i.e., in parallel or substantially parallel with each other, the likelihood of a short circuit or an interference between the lead wires 43 can be reduced.

The projecting portions 83 are arranged to project from a lateral surface of the body portion 81. Referring to FIGS. 3 and 4, three of the projecting portions 83 are arranged to project from the first flat surface 811 in the second direction D2. In addition, three of the projecting portions 83 are arranged to project from the second flat surface 812 in the second direction D2. That is, at least one of the projecting portions 83 is arranged to project in the second direction D2 from at least one of the two flat surfaces 811 and 812. Further, one of the projecting portions 83 is arranged to project in the third direction D3 from each of both end portions of the body portion 81 in the third direction D3. The projecting portions 83 arranged to project in the third direction D3 from both the end portions of the body portion 81 in the third direction D3 will be referred to as second projecting portions 85.

The projecting portions 83 arranged to project from the first and second flat surfaces 811 and 812 will now be described below. This description will be made with reference to one of the projecting portions 83 on the first flat surface 811 as a representative of the six projecting portions 83. Referring to FIGS. 3, 4, and 5, the projecting portion 83 is defined integrally with the body portion 81. The projecting portion 83 is arranged to extend along the first flat surface 811 from an end portion of the body portion 81 on the first side toward an end portion of the body portion 81 on the second side in the first direction D1. The flange portion 84 is arranged at the end portion of the body portion 81 on the first side in the first direction D1. Therefore, an end portion of the projecting portion 83 in the first direction D1 is joined to the flange portion 84. The joining of the projecting portion 83 and the flange portion 84 leads to increased strength of the projecting portion 83.

The projecting portion 83 includes a lower portion 831 and an upper portion 832. The lower portion 831 is semi-columnar, being semicircular in a section taken along a plane perpendicular to the first direction D1. The upper portion 832 is defined continuously with an end of the lower portion 831 on the second side in the first direction D1. The upper portion 832 includes a slanting surface 833 arranged to approach the first flat surface 811 as the slanting surface 833 extends to the second side in the first direction D1. An end portion of the slanting surface 833 on the second side in the first direction D1 meets the first flat surface 811. A junction thereof with the first flat surface 811 is a straight line parallel to the third direction D3.

Referring to FIG. 5, a dimension L1 of the projecting portion 83 measured in the first direction D1 is smaller than a dimension L2 of the body portion 81 measured in the first direction D1. The projecting portion 83 is shorter than the body portion 81 in the first direction D1.

As described above, three of the projecting portions 83 are arranged to project from the first flat surface 811 in the second direction D2. Here, relative positions of the three projecting portions 83 and the three through holes 82 will now be described below. In the following description, the through hole 82 in the middle will be referred to as a middle through hole 82C as necessary, and the through holes 82 to the left and right of the middle through hole 82C in FIG. 6 will be referred to as a first through hole 82F and a second through hole 82S, respectively, as necessary. Similarly, the projecting portion 83 in the middle will be referred to as a middle projecting portion 83C1, and the projecting portions 83 to the left and right of the middle projecting portion 83C1 in FIG. 4 will be referred to as a first adjacent projecting portion 83F1 and a second adjacent projecting portion 83S1, respectively. In addition, of the projecting portions 83 arranged to project from the second flat surface 812, the projecting portion 83 in the middle will be referred to as a middle projecting portion 83C2, and the projecting portions 83 to the left and right of the middle projecting portion 83C2 in FIG. 4 will be referred to as a first adjacent projecting portion 83F2 and a second adjacent projecting portion 83S2, respectively.

Referring to FIG. 4, each of the middle projecting portions 83C1 and 83C2 is arranged in the middle of the body portion 81 in the third direction D3. That is, the middle projecting portions 83C1 and 83C2 are arranged to coincide with each other when viewed in the second direction D2. In addition, the first adjacent projecting portions 83F1 and 83F2 are arranged to the left of the middle projecting portions 83C1 and 83C2, respectively, in FIG. 4. The first adjacent projecting portions 83F1 and 83F2 are also arranged to coincide with each other when viewed in the second direction D2. Further, the second adjacent projecting portions 83S1 and 83S2 are arranged to the right of the middle projecting portions 83C1 and 83C2, respectively, in FIG. 4. The second adjacent projecting portions 83S1 and 83S2 are also arranged to coincide with each other when viewed in the second direction D2.

That is, the middle projecting portions 83C1 and 83C2, forming a pair, are arranged to project to opposite sides in the second direction D2; the first adjacent projecting portions 83F1 and 83F2, forming a pair, are arranged to project to opposite sides in the second direction D2; and the second adjacent projecting portions 83S1 and 83S2, forming a pair, are arranged to project to opposite sides in the second direction D2.

Referring to FIG. 4, a middle of each of the first adjacent projecting portions 83F1 and 83F2 in the third direction D3 is arranged on the middle side of a center of the first through hole 82F in the third direction D3. In addition, a middle of each of the second adjacent projecting portions 83S1 and 83S2 in the third direction D3 is arranged on the middle side of a center of the second through hole 82S in the third direction D3. That is, of the projecting portions 83, at least one of the projecting portions 83F1, 83F2, 83S1, and 83S2 arranged at either end in the third direction D3 is displaced to the middle side in the third direction D3 relative to a corresponding one of the through holes 82F and 82S arranged at either end in the third direction D3. In addition, at least one of the projecting portions 83C1, 83C2, 83F1, 83F2, 83S1, and 83S2 is displaced in the third direction D3 relative to the through holes 82C, 82F, and 82S.

The body portion 81 is substantially in the shape of a rectangular parallelepiped. In addition, the body portion 81 includes the through holes 82 defined therein, each through hole 82 extending from one surface of the body portion 81 in the first direction D1. Accordingly, a distance between the outer surface of the body portion 81 and an end of each through hole 82 in the second direction D2 is short. In other words, the body portion 81 has a decreased thickness portion at the end of the through hole 82 in the second direction D2. When the bushing 8 is inserted into the lead wire insert hole 14, the projecting portions 83 are pressed toward an interior of the bushing 8 by a wall surface of the lead wire insert hole 14, which will be described in detail below. The decreased thickness portion tends to be easily deformed.

Arranging the middle of each of the first adjacent projecting portions 83F1 and 83F2 in the third direction D3 on the middle side of the center of the first through hole 82F in the third direction D3 reduces the likelihood that a decreased thickness portion of the body portion 81 in the vicinity of the first through hole 82F will be deformed when the first adjacent projecting portions 83F1 and 83F2 are pressed in the second direction D2. Similarly, arranging the middle of each of the second adjacent projecting portions 83S1 and 83S2 in the third direction D3 on the middle side of the center of the second through hole 82S in the third direction D3 reduces the likelihood that a decreased thickness portion of the body portion 81 in the vicinity of the second through hole 82S will be deformed when the second adjacent projecting portions 83S1 and 83S2 are pressed in the second direction D2. Thus, the likelihood of a deformation of either of the first and second through holes 82F and 82S is reduced, facilitating the insertion of the lead wires 43.

In the bushing 8 illustrated in FIG. 4, a middle of each of the middle projecting portions 83C1 and 83C2 in the third direction D3 is arranged to coincide with a center of the middle through hole 82C when viewed in the second direction D2. This contributes to preventing poor balance when the bushing 8 is inserted into the lead wire insert hole 14. Note, however, that the middle of each of the middle projecting portions 83C1 and 83C2 in the third direction D3 may alternatively be displaced in the third direction D3 relative to the center of the middle through hole 82C. This will reduce the likelihood that a decreased thickness portion of the body portion 81 in the vicinity of the middle through hole 82C will be deformed. Thus, the likelihood of a deformation of the middle through hole 82C is reduced, facilitating the insertion of the lead wire 43.

The second projecting portions 85 are arranged to project in the third direction D3 from both end surfaces of the body portion 81 in the third direction D3. That is, the projecting portions 83 include at least one second projecting portion 85 arranged to project in the third direction D3 from at least one of both end surfaces of the body portion 81 in the third direction D3. Each second projecting portion 85 is identical in structure to the above-described projecting portion 83. As illustrated in FIGS. 3, 4, and so on, the body portion 81 includes an elongated bottom surface with a longitudinal direction thereof being parallel to the third direction D3, and is in the shape of a column extending in the first direction D1. The body portion 81 having such a columnar shape has a high strength in the third direction D3, which is the longitudinal direction thereof. That is, the body portion 81 tends to become deformed less easily when a force acts on the body portion 81 in the third direction D3 than when a force acts on the body portion 81 in the second direction D2. Then, the second projecting portions 85 are able to increase durability of the bushing 8, since the second projecting portions 85 project in the third direction D3 from both the end portions of the body portion 81 in the longitudinal direction, in which the body portion 81 has a high strength. In addition, a sufficient load capacity of the bushing 8 can be achieved.

Figure 7:
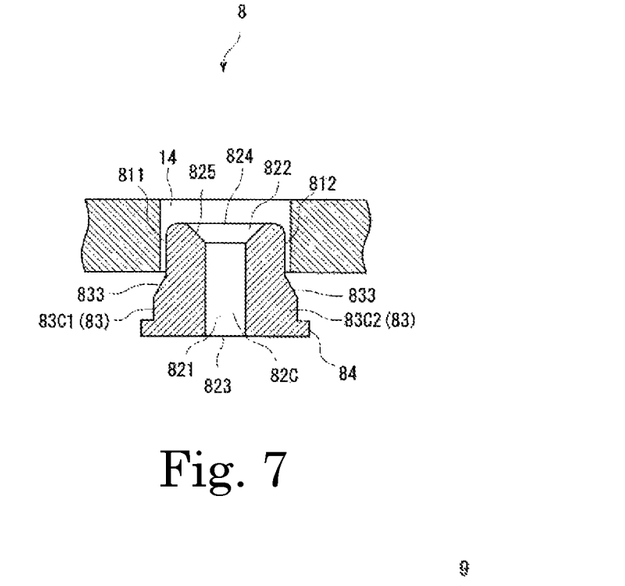
FIG. 7 is a sectional view of the bushing and a portion of a base taken along a plane perpendicular to a third direction, illustrating how the bushing is inserted into a lead wire insert hole according to the first preferred embodiment of the present invention.

Next, a procedure for inserting the bushing 8 into the lead wire insert hole 14 will now be described below. FIG. 7 is a sectional view of the bushing 8 and a portion of the base 1 taken along a plane perpendicular to the third direction D3, illustrating how the bushing 8 is inserted into the lead wire insert hole 14.

Referring to FIG. 7, a portion of the body portion 81 of the bushing 8 on the second side in the first direction D1 is inserted into an axially lower opening of the lead wire insert hole 14 defined in the base plate 11. Then, a portion of the body portion 81 on the first side in the first direction D1 is pressed. Here, the flange portion 84 is arranged at the end portion of the body portion 81 on the first side in the first direction D1. This contributes to increasing an area that a finger(s) of an operator, a tool, a jig, or the like touches when the body portion 81 is pressed, which leads to improved workability.

Then, the body portion 81 of the bushing 8 moves in the lead wire insert hole 14, so that the projecting portions 83, including the second projecting portions 85, are brought into contact with a peripheral portion of the lead wire insert hole 14. At this time, the slanting surfaces 833 of the projecting portions enter into a gap between the body portion 81 and the wall surface of the lead wire insert hole 14. Each slanting surface 833 is, as it were, in the form of a wedge, and as the slanting surfaces 833 move into the lead wire insert hole 14, the projecting portions 83, including the second projecting portions 85, receive an inward force from the wall surface of the lead wire insert hole 14. With this inward force, the bushing 8 is held in the lead wire insert hole 14. Then, the bushing 8 is securely fixed in the lead wire insert hole 14 with the flange portion 84 being brought into contact with the peripheral portion of the lead wire insert hole 14.

For example, when the lead wire insert hole 14 is larger than the body portion 81 of the bushing 8, a space is defined between the wall surface of the lead wire insert hole 14 and the portion of the body portion 81 on the second side in the first direction D1, where no projecting portion 83 is arranged. When the bushing 8 includes the projecting portions 83, the projecting portions 83 are inserted into this space, and the projecting portions 83 are pressed by the wall surface of the lead wire insert hole 14. As a result, inward forces, i.e., fixing forces, act on the body portion 81, so that the bushing 8 is securely fixed. Notice that the second projecting portions 85 also produce inward forces acting on the body portion 81 like the other projecting portions 83.

The strength with which the bushing 8 is fixed to the wall surface of the lead wire insert hole 14 varies depending on the dimension L1 of each projecting portion 83 measured in the first direction D1. Accordingly, the strength with which the bushing 8 is fixed can be adjusted by adjusting the above dimension of the projecting portion 83. For example, as the above dimension of the projecting portion 83 increases, the strength of the fixing increases, but a greater force is required because of increased resistance. Meanwhile, as the above dimension of the projecting portion 83 decreases, the fitting of the bushing 8 is made easier, but the strength of the fixing decreases. In the present preferred embodiment, the dimension L1 of the projecting portion 83 measured in the first direction D1 is arranged to be smaller than the dimension L2 of the body portion 81 measured in the first direction D1. This arrangement allows the strength with which the bushing 8 is fixed to be sufficient while allowing improved workability in the fitting. The dimension L1 of each projecting portion 83 measured in the first direction D1 may be arranged to be equal to or smaller than a half of the dimension L2 of the body portion 81 measured in the first direction D1.

The dimension L2 of the body portion 81 of the bushing 8 measured in the first direction D1 is arranged to be greater than a length of the lead wire insert hole 14. Accordingly, when the flange portion 84 has been brought into contact with the peripheral portion of the lead wire insert hole 14, an end of the body portion 81 of the bushing 8 on the second side in the first direction D1 protrudes above the base 1.

Figure 8:
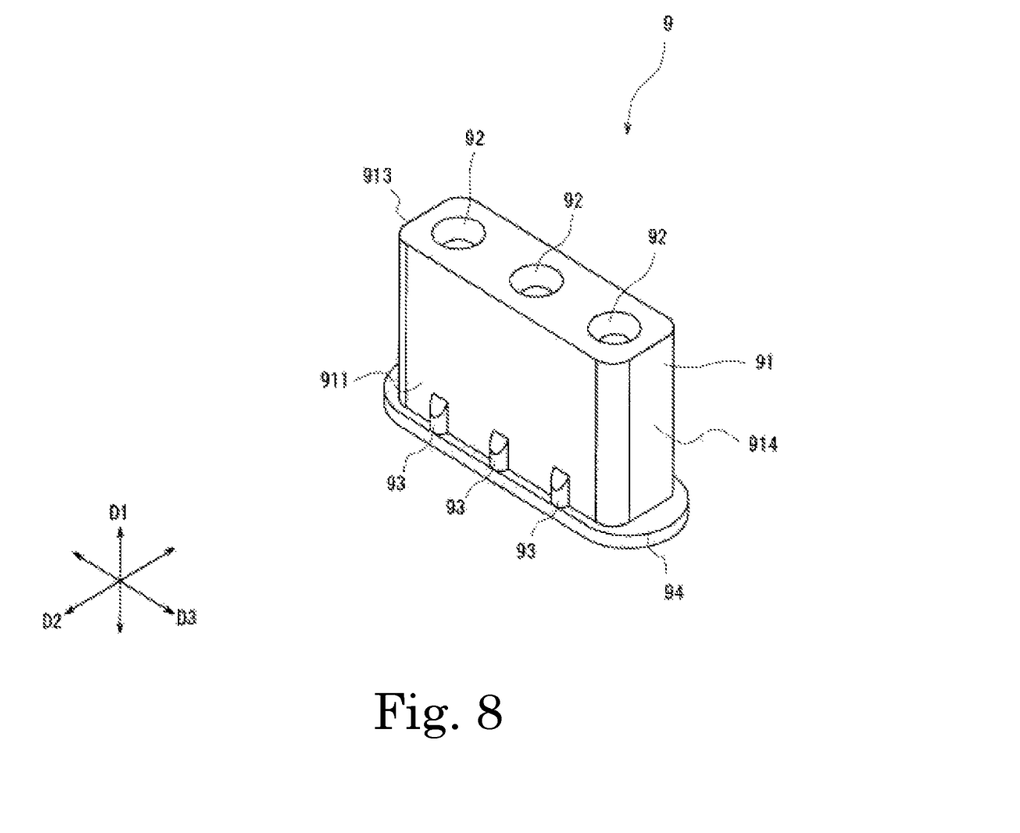
FIG. 8 is a perspective view of a bushing of a motor according to a second preferred embodiment of the present invention.
Figure 9:
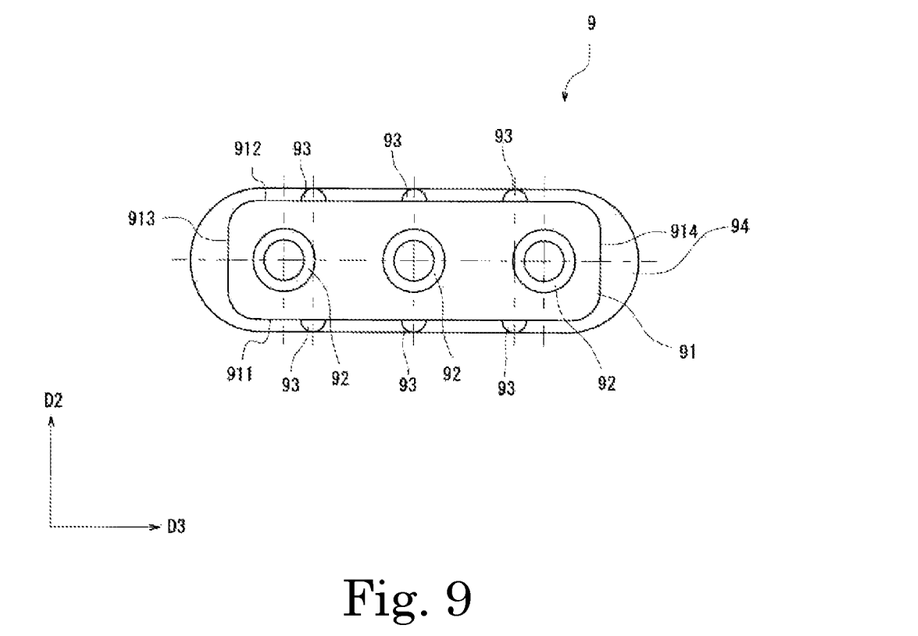
FIG. 9 is a plan view of the bushing illustrated in FIG. 8.
Figure 10:
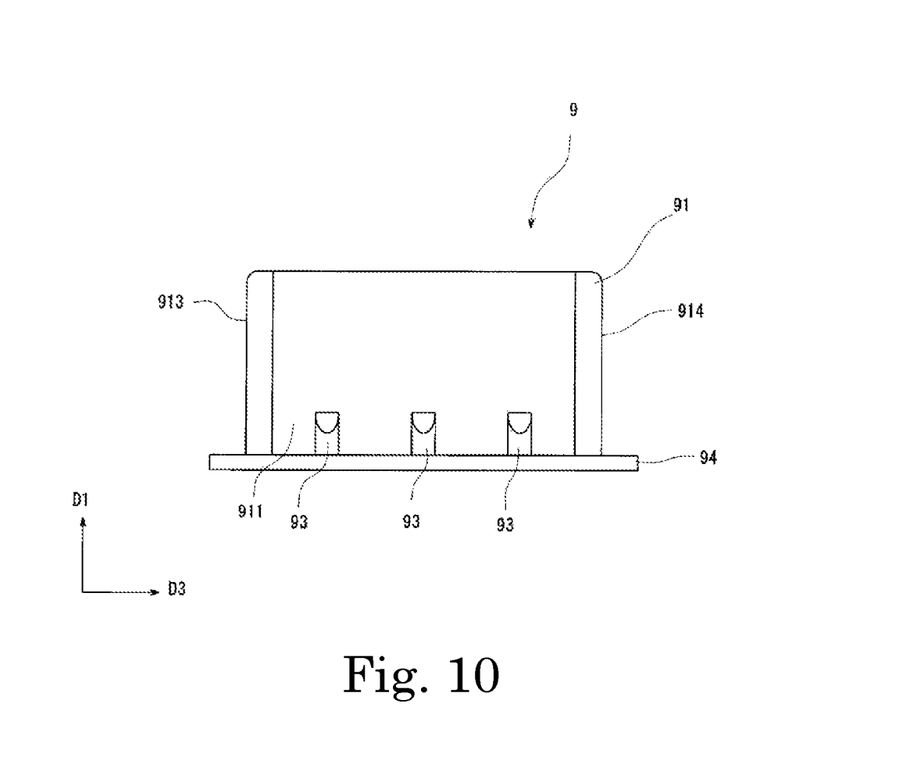
FIG. 10 is a front view of the bushing illustrated in FIG. 8.
Figure 11:
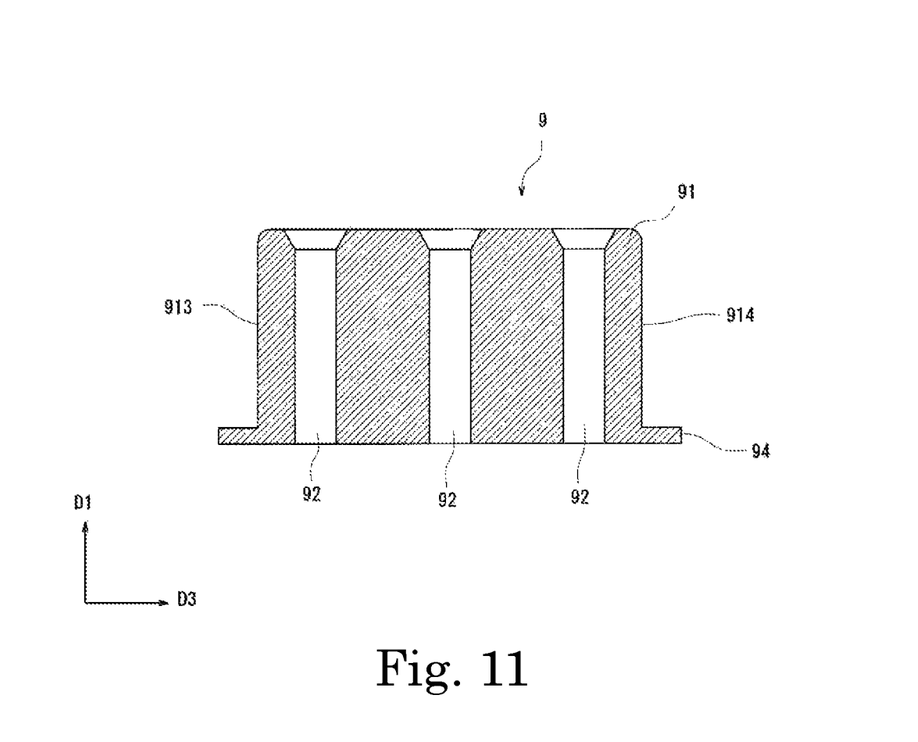
FIG. 11 is a vertical sectional view of the bushing illustrated in FIG. 8.

A bushing 9 used in a motor according to a second preferred embodiment of the present invention will now be described below with reference to the accompanying drawings. FIG. 8 is a perspective view of the bushing 9 of the motor according to the second preferred embodiment of the present invention. FIG. 9 is a plan view of the bushing 9 illustrated in FIG. 8. FIG. 10 is a front view of the bushing 9 illustrated in FIG. 8. FIG. 11 is a vertical sectional view of the bushing 9 illustrated in FIG. 8. It is assumed in the description of the present preferred embodiment that a vertical direction of the bushing 9 illustrated in FIG. 10 is a first direction D1, that a widthwise direction of the bushing 9 illustrated in FIG. 9 is a second direction D2, and that a longitudinal direction of the bushing 9 illustrated in FIG. 9 is a third direction D3. The bushing 9 according to the present preferred embodiment is different from the bushing 8 according to the first preferred embodiment in that a body portion 91 is longer than the body portion 81, and that no second projecting portion 85 is provided, but is otherwise essentially identical in structure to the bushing 8.

Referring to FIGS. 8 and 9, the bushing 9 includes the body portion 91, three through holes 92, six projecting portions 93, and a flange portion 94. The body portion 91 includes a first flat surface 911 and a second flat surface 912. In addition, the body portion 91 includes, at both ends thereof in the third direction D3, a third flat surface 913 and a fourth flat surface 914. The three through holes 92 are each arranged to pass through the body portion 91 in the first direction D1, and are arrayed on a straight line extending in the third direction D3. Each through hole 92 is identical in structure to the through holes 82 defined in the bushing 8 except in length. Accordingly, a detailed description of the through hole 92 is omitted.

Three of the six projecting portions 93 are arranged to project in the second direction D2 from each of the first and second flat surfaces 911 and 912. A dimension of each projecting portion 93 measured in the first direction D1 is arranged to be smaller than a dimension of the body portion 91 measured in the first direction D1. This arrangement allows sufficient strength to be generated to fix the bushing 9 when the bushing 9 is fitted into the lead wire insert hole 14 while allowing improved workability in the fitting. Each projecting portion 93 is identical in structure to each projecting portion 83 of the bushing 8. Accordingly, a detailed description of the projecting portion 93 is omitted. In addition, the flange portion 94 is identical in structure to the flange portion 94 of the bushing 8. Accordingly, a detailed description of the flange portion 94 is omitted.

The bushing 9 having the above-described structure can be inserted into the lead wire insert hole 14 in a manner similar to that in which the bushing 8 according to the first preferred embodiment is inserted into the lead wire insert hole 14.

The number of through holes defined in each of the bushings 8 and 9 according to the above-described preferred embodiments is three. This is because the motor A is a three-phase brushless motor, and wires (i.e., power wires) for supplying three-phase electric currents are separately inserted through the through holes. Note that, in the case where a stranded wire or the like is used, for example, the number of through holes may be one or two. Also note that the number of through holes may be greater than three when, for example, a wire, e.g., a signal wire, other than the power wires is inserted through any of the through holes. Further, in the case where three or more wires are inserted, the wires may be divided into groups, and each group may be passed through a separate one of a plurality of lead wire insert holes 14.

Preferred embodiments of the present invention are applicable to, for example, motors arranged to drive storage apparatuses, such as hard disk apparatuses, optical disk apparatuses, and the like.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A motor comprising:
a stator including a plurality of coils;
a base arranged opposite to an end surface of the stator on one side;
at least one lead wire insert hole arranged to pass through the base from a surface of the base which faces the stator to an opposite surface of the base, and arranged to have a lead wire extending from any of the coils pass therethrough; and
a bushing inserted in the lead wire insert hole; wherein the bushing includes:

a body portion arranged to extend in a first direction in which the bushing is inserted into the lead wire insert hole;

a plurality of through holes each of which is arranged to pass through the body portion in the first direction; and a plurality of projecting portions each of which is arranged to extend in the first direction, and project from a lateral surface of the body portion in a direction perpendicular to the first direction, the lateral surface extending in the first direction;

each through hole includes:

a first hole portion being cylindrical, extending in the first direction, and arranged to have an opening on a first side in the first direction; and a second hole portion arranged to have an opening on a second side in the first direction, and to be continuous with the first hole portion in the first direction, and including a slanting surface arranged to decrease in a diameter toward the first hole portion; and a portion of the lead wire is arranged in a corresponding one of the through holes.

2. The motor according to claim 1, wherein the slanting surface of the second hole portion is arranged to slant such that an extension of the slanting surface into the first hole portion crosses a wall surface of the first hole portion.

3. The motor according to claim 1, wherein the body portion includes two flat surfaces arranged in parallel with each other in a second direction perpendicular to the first direction; and at least one of the plurality of projecting portions is arranged to project in the second direction from at least one of the two flat surfaces.

4. The motor according to claim 3, wherein the plurality of through holes are arrayed on a straight line extending in a third direction perpendicular to both the first and second directions.

5. The motor according to claim 4, wherein at least one of the plurality of projecting portions is displaced in the third direction relative to the through holes.

6. The motor according to claim 5, wherein, at least two of the projecting portions are positioned at locations inward from two of the through holes in the third direction, the two of the through holes opposing each other in the third direction.

7. The motor according to claim 4, wherein the plurality of projecting portions include at least one second projecting portion arranged to project in the third direction from at least one of both end surfaces of the body portion in the third direction.

8. The motor according to claim 1, wherein each projecting portion is arranged to be shorter than the body portion in the first direction.

9. The motor according to claim 1, wherein the bushing further includes a flange portion arranged to extend outward at an end portion of the body portion on the first side in the first direction.

10. The motor according to claim 9, wherein an end portion of each projecting portion in the first direction is joined to the flange portion.

11. A motor comprising:

a stator including a plurality of coils;

a base arranged opposite to an end surface of the stator on one side;

at least one lead wire insert hole arranged to pass through the base from a surface of the base which faces the stator to an opposite surface of the base, and arranged to have a lead wire extending from any of the coils pass therethrough; and a bushing inserted in the lead wire insert hole; wherein the bushing includes:

a body portion arranged to extend in a first direction in which the bushing is inserted into the lead wire insert hole;

a plurality of through holes each of which is arranged to pass through the body portion in the first direction; and a plurality of projecting portions each of which is arranged to extend in the first direction, and project from a lateral surface of the body portion in a direction perpendicular to the first direction, the lateral surface extending in the first direction;

each through hole includes:

a first hole portion being cylindrical, extending in the first direction, and arranged to have an opening on a first side in the first direction; and a second hole portion arranged to have an opening on a second side in the first direction, and to be continuous with the first hole portion in the first direction, and including a slanting surface arranged to decrease in a diameter toward the first hole portion;

a portion of the lead wire is arranged in a corresponding one of the through holes;

each projecting portion is arranged to be shorter than the body portion in the first direction; and a dimension of each projecting portion measured in the first direction is arranged to be equal to or smaller than a half of a dimension of the body portion measured in the first direction.

* * * * *